United States Patent [19]

Zoltan

[11] 3,912,397
[45] Oct. 14, 1975

[54] STELLAR SCANNING-CHOPPING SYSTEM
[75] Inventor: Bart J. Zoltan, Emerson, N.J.
[73] Assignee: The Singer Company, Little Falls, N.J.
[22] Filed: Jan. 8, 1973
[21] Appl. No.: 321,895

[52] U.S. Cl. ............... 356/141; 356/152; 250/203 R
[51] Int. Cl. .......................................... G01b 11/26
[58] Field of Search .......... 356/141, 152; 250/203 R

[56] References Cited
UNITED STATES PATENTS

| | | | |
|---|---|---|---|
| 2,934,824 | 5/1960 | Braybrook et al. | 356/152 |
| 3,006,236 | 10/1961 | Michaud | 356/141 |
| 3,015,249 | 1/1962 | Taylor | 356/141 |
| 3,147,384 | 9/1964 | Fenton et al. | 250/203 R |
| 3,229,101 | 1/1966 | Chtayat | 250/233 |

Primary Examiner—Maynard R. Wilbur
Assistant Examiner—S. C. Buczinski
Attorney, Agent, or Firm—T. W. Kennedy

[57] ABSTRACT

A star scanning device for use in inertial navigation systems and the like in which a scanning disk containing a V slit and having a position known at all times is used to determine the X and Y position of a star with respect to a fixed platform. Also shown is a chopping disk used with the scanning disk to improve performance and the system to demodulate and process the signals obtained in order to provide the coordinate outputs for further use in the inertial system.

8 Claims, 4 Drawing Figures

STELLAR SCANNING-CHOPPING SYSTEM

BACKGROUND OF THE INVENTION

This invention relates to inertial navigation systems in general, and more particularly to a star scanning device useful in conjunction with such systems.

Inertial platforms used in guidance and navigation applications such as in missiles and on long-range aircraft are subject to various drift errors which occur over a long period of time. To maintain a check on these errors and to reorient the platform, various systems have been designed. Generally, these systems make use of the fact that with respect to an inertial platform, a star should remain fixed. Thus, it is possible to use one of the stars as a reference on which the inertial platform positioning may be based.

In some applications a star is constantly tracked and the reference maintained to keep a constant relationship with the star. These are generally considered as tracking systems. The present system is more applicable where the platform is allowed to drift over a period of time and is then updated or realigned. In this latter case, a scanner is required which will scan a field of view having a size at least equal to the maximum drift expected from the platform. This type of system is generally described as a stellar scanning system. In most prior art scanning systems, the scanning has been accomplished by scanning the required field of view with a mirror or the like and imaging the mirror onto a detector. Various problems have been encountered in this type of system such as problems with background noise and detector noise. One known method of overcoming some of these noise problems is through modulating or chopping the optical input. However, in mirror type scanning systems this has not proved to be particularly practical. Thus, there is a need for a scanning system which can scan the required field of view in the presence of background illumination and still obtain an accurate output representative of a star in that field. Such a system must not only be able to detect a star, but also to determine its location with respect to a reference. In addition, it is desirable that a simple detector may be employed in the application to avoid high cost and/or size and packaging problems.

SUMMARY OF THE INVENTION

The system of the present inventor fulfills the above noted requirements through the use of a scanning disk onto which the field of view is imaged. A telescope is fixed to the inertial platform and aimed to encompass the field of view in which the star to be found is contained. The telescope output is imaged on the scanning disk scanner which has two slits thereon, one slit being along a radius of the scanner and the other slit at an angle thereto. The position of this scanner is known through the use of an encoder and thus the point at which each of the slits intersects the light from the star may be determined. The vertical or radial slit permits determining the location of the star on one axis and, from the time required between the star being crossed by that slit and the next slit, it is possible to compute the other star coordinate. Behind the first scanner is a second circular scanner (more correctly a chopper) having alternate clear and opaque sections which chops the light coming through the other two slits. The light passing through the chopper is then imaged onto a detector and provided to a demodulator where it is demodulated with the chopper frequency being used as a reference. The signal is then processed along with the information obtained the encoder of the first scanner to provide outputs representative of the X and Y location for further use in the navigation system.

DETAILED DESCRIPTION OF THE PREFERRED EMBODIMENT

Figure 1:
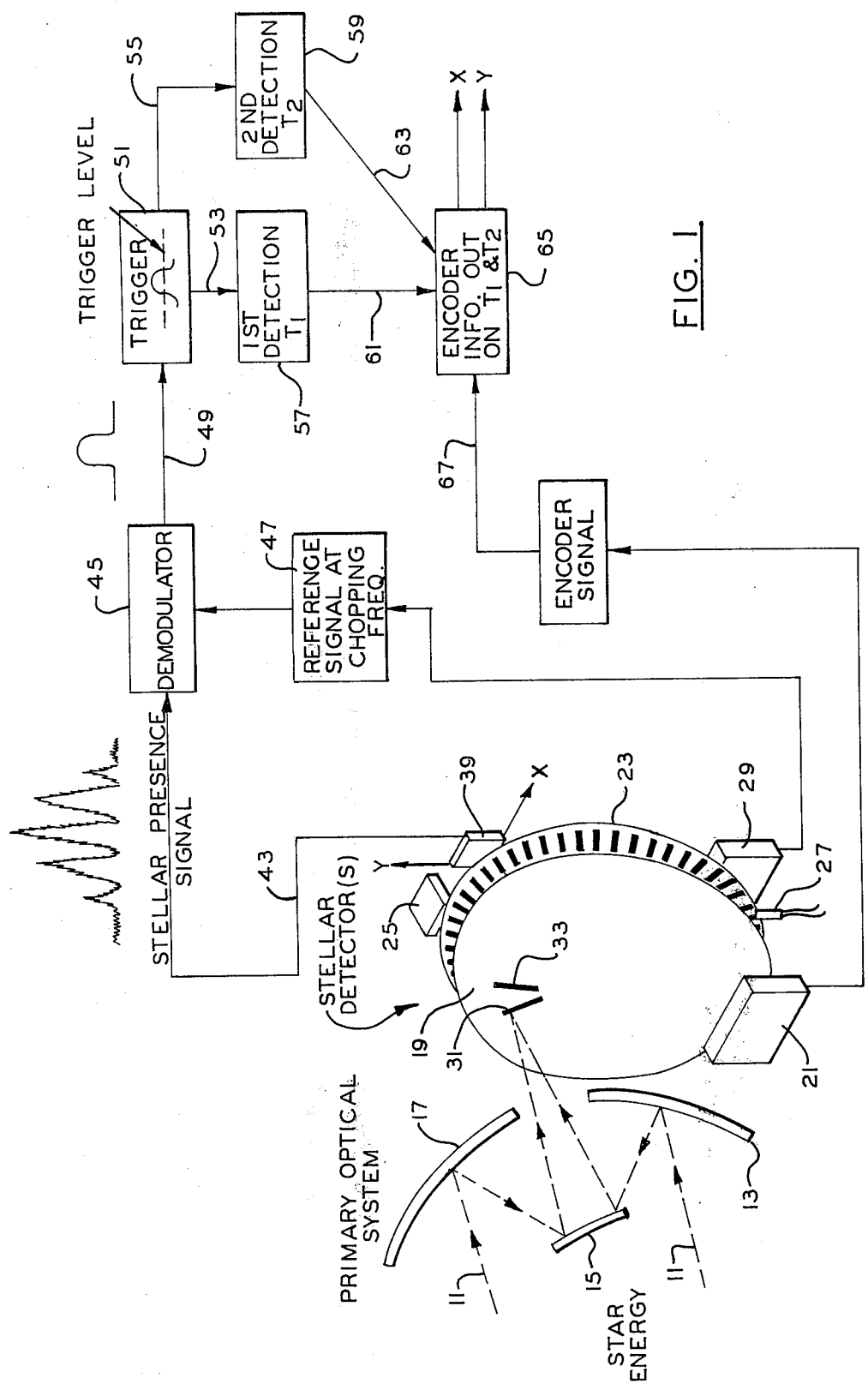
FIG. 1 is a system diagram illustrating a preferred embodiment of the system of the present invention.
Figure 2A:
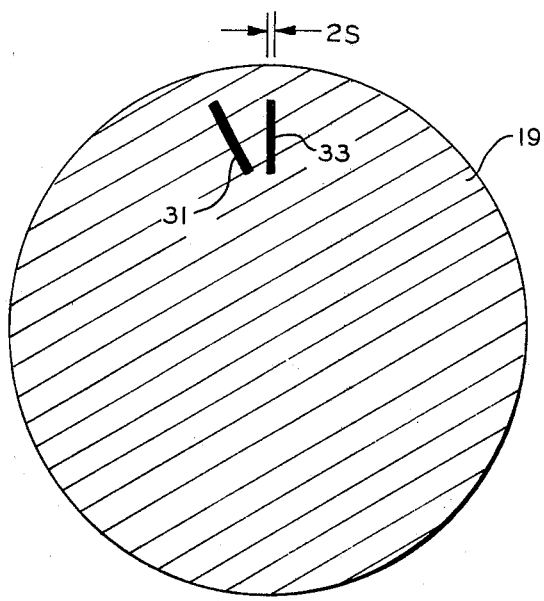
FIG. 2A is an elevation view of the scanning disk of FIG. 1.

FIG. 1 is an overall block diagram of a system in which the present invention may be used. Light from a star will be provided in the form of rays 11 which will strike a mirror in 13 in a conventional telescope system and then be reflected by mirror 15 through the opening 17 in mirror 13 to a first disc 19. Disc 19 will be driven at a predetermined speed by a motor and encoder assembly 21. Assembly 21 will contain both a small electric motor and an angular encoder such as a shaft encoder to provide an accurate indication of the position of disc 19 at all times. The light which passes through disc 19 will then be chopped by a chopping disc 23 which will be rotated at a speed much greater than that of disc 19. This disc will have a disc drive system 25 which will comprise another electric motor or may be an air blast system to start the disc spinning. Since the disc does not need to spin continually, such an air blast could start it spinning with its inertia keeping it moving for time sufficient to make the scanning measurements. The chopper frequency reference is developed by providing a light source 27 such as a light-emitting diode and a detector 29 on opposite sides of the chopping disc 23. The detector 29 will thus provide a reference frequency output. In general, the field of view to be scanned will be encompassed by the slits 31 and 33 of disc 19 when in the position shown. That is to say, once each rotation, the two slits 31 and 33 will pass through the field of view only once. It should be noted, however, that additional sets of slits may be provided if desired. The construction of disc 19 is shown in more detail on FIG. 2A. Each of the slits 31 and 33 is made to be a width which will be equal to the width of two stars. The slit 33 is vertical along a radius of the disc 19. The slit 31 is at an angle thereto. From the encoder the exact position at the disc when it intersects a star may be determined. From this information, the position of the star in one direction, for example, the X direction may be determined. Because the other slit is at an angle, the position of the star in the Y direction may then be determined from the time required between the crossing of slit 33 and the crossing of slit 31.

Figure 2B:
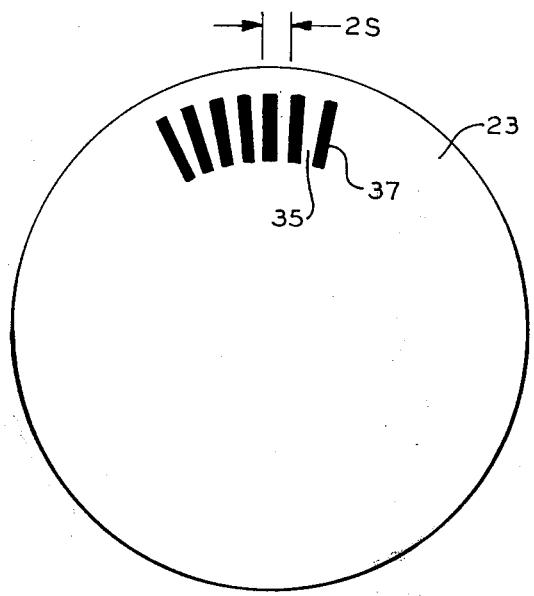
FIG. 2B is an elevation view of the chopper disk of FIG. 1.

The disc 23 is shown in more detail on FIG. 2B. This disc contains an alternating pattern of clear areas 35 and opaque areas 37. The spacing of one full cycle, i.e., from opaque to opaque is made two star widths wide as indicated by the dimension 2S. At this point, some note should be made of the reason for chopping. Many detectors exhibit internal noise which is greatly reduced at higher frequencies. Thus, chopping the light coming into the system will provide a higher signal to noise ratio and thereby improve performance of the detector. The chopper also helps to establish a background light output beyond which the light of a star may be detected. When no star is in the field of view, the background illumination will alternately pass through and not pass through the disc 23, thus establishing an average background level from which the star illumination may be distinguished.

Returning to FIG. 1, the illumination passing through the disc 23 will then fall on a detector 39. It should be noted that there is no requirement for imaging the light at any point on the detector, as in some previous systems. The light is imaged at the disc 19 and thus light passing through the two discs 19 and 23 no matter where it falls on the detector 39 will provide an output, the position information having been obtained through use of the encoder information from encoder 21. Thus, a very simple and inexpensive detector may be used.

Figure 3:
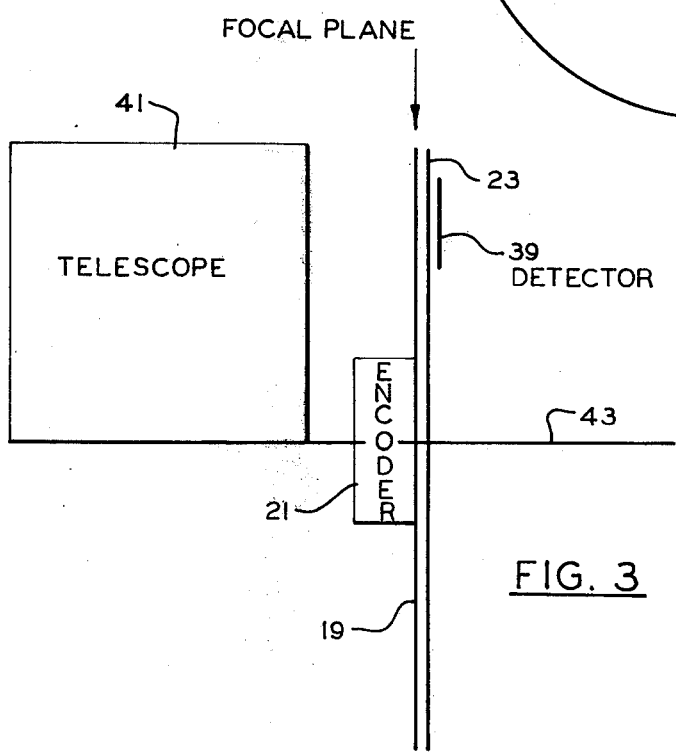
FIG. 3 is a side view illustrating the relative locations of the telescope and scanners of FIG. 1.

The specific arrangement of the discs and detector are as shown by the view of FIG. 3. The focal plain of the telescope 41 will be located at the disc 19. The disc 23 is located right behind disc 19 and then right behind the disc 23 the detector 39. The encoder and motor 21 will be located on the center line 41 of the disc 19 to drive the disc as indicated.

The signal out of detector 39 will be provided on line 43 to a demodulator 45 which will have a reference input obtained from the detector 29 behind the disc 23. A block 47 is shown through which the reference signal passes. This may contain amplifiers or signal conditioning equipment as required. The signal input to block 45 will be as shown by the waveform above line 43. That is to say, it will have an increased magnitude at the point where the star is encountered and will be chopped or modulated by the chopping disc. After passing through the modulator 45 the signal will appear as shown by the waveform above line 49. The output on line 49 is provided to a trigger circuit 51 which is preset at a level indicative of the star illumination. Thus, each time a star signal is detected trigger 51 will provide an output. The output of trigger block 51 is provided on lines 53 and 55 to a first detection block 57 and a second detection block 59. These blocks will contain conventional logic elements such as flip-flops, gates, etc., arranged so that the output of the first detection block 57 on line 61 will occur only on the first triggering and the output of the block 59 on line 63 only on a second triggering occuring shortly after a first triggering. These outputs are provided into a block 65 which has as another input the encoder signal from line 67. This block may, for example, comprise a pair of storage registers, each having gated into them the encoder output in response to the signals on lines 61 and 63. For example, the first register would be updated in response to an output from line 61 and the second register updated in response to an output on line 63. These two outputs may then be used to compute the X and Y locations of the star and provide information to the inertial platform to bring it back in alignment through the use of conventional computing techniques using the geometry of the disc 19. Additional fields of view may be provided by providing additional telescopes 41 and detectors 39 along with separate electronics for each detector, thus permitting use of the same discs 19 and 23 to cover more than one field of view.

Another possible embodiment would be to maintain the V slit fixed with respect to the platform and move the platform across the field of view at all times keeping track of its position. Then, upon detecting the star passing through the two slits, similar computations to those noted above could be made to realign the platform to its proper position. Such a system would be particularly useful in applications such as long range navigation in large aircraft where sufficient time is available to permit moving the platform to accomplish the scanning.

Thus, an improved stellar scanning system which eliminates problems of background and detector noise and permits using a simple detector has been shown. Although specific embodiments have been shown and described, it will be obvious to those skilled in the art that various modifications may be made without departing from the spirit of the invention which is intended to be limited solely by the appended claims.

What is claimed is:

1. In a stellar scanning system, apparatus to provide an output indicative of the position of a star in two orthogonal directions comprising:
   A. telescope covering the field of view in which the star is expected to be found;
   B. a first disc having thereon a first slit along a radius of said disc and a second slit adjacent and at an angle thereto, said disc being at the focal plane of said telescope;
   C. a second disc located on the side of said first disc opposite said telescope, said disc containing along radii thereof alternate clear and opaque areas, the spacing from one opaque area to the next being equal to the width of the slits in said first disc;
   D. means to effect relative motion in a direction essentially perpendicular to said first slit between said first disc and the star;
   E. means coupled to said first disc and providing an output indicative of the position thereof with respect to a known reference;
   F. means to rotate said second disc at a speed substantially greater than rate of relative motion of said first disc;
   G. means to provide an output indicative of the modulation frequency of said second disc;
   H. a photosenitive detector placed on the side of said second disc opposite said first disc and aligned with the slits on said first disc, whereby from the output of said detector, said modulation frequency and the output of an encoder, the X and Y position of a star imaged on said first disc may be determined;
   I. a demodulator obtaining its signal input from said first detector and its reference input from said second detector;
   J. a trigger circuit coupled to the output of said demodulator and responsive to a signal therefrom having a magnitude representative of the light illumination from a star;
   K. a first detection circuit obtaining its input from said trigger circuit and providing an output upon a first input from said trigger circuit;
   L. a second detection circuit obtaining its input from said trigger circuit and providing an output after a second detection by said trigger circuit; and
   M. means having as inputs the output of said encoder and the outputs of said first and second detection circuits and providing as first and second outputs the value of said encoder input at the occurrence of respective outputs from said first and said second detection circuits.

2. The invention according to claim 1 wherein said relative motion means comprises means to rotate said first disk and said position output means comprises an angular encoder coupled to said first disk.

3. The invention according to claim 2 wherein the width of said slits on said first disc is equal to two star widths.

4. The invention according to claim 3 wherein said means to drive said first disc comprises an electric motor.

5. The invention according to claim 4 wherein said means to drive said second disc comprises air blast means.

6. The invention according to claim 4 wherein said means to drive said second disc comprises an electric motor.

7. The invention according to claim 4 wherein said means to develop said modulation frequency comprises a light source on one side of said second disc and a photosensitive detector on the other side, said photosensitive detector providing an output at said modulation frequency.

8. The invention according to claim 7 wherein said light source is a light-emitting diode.

* * * * *